(12) United States Patent
Shimizu et al.

(10) Patent No.: US 8,182,397 B2
(45) Date of Patent: May 22, 2012

(54) HYDRAULIC CONTROL APPARATUS FOR AUTOMATIC TRANSMISSION

(75) Inventors: Tetsuya Shimizu, Anjo (JP); Kenichi Tsuchida, Hazagun (JP); Akitomo Suzuki, Anjo (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 480 days.

(21) Appl. No.: 12/585,833

(22) Filed: Sep. 25, 2009

(65) Prior Publication Data

US 2010/0081545 A1  Apr. 1, 2010

(30) Foreign Application Priority Data

Sep. 30, 2008 (JP) ................ 2008-255095

(51) Int. Cl.
*F16H 61/26* (2006.01)
*F16H 31/00* (2006.01)
(52) U.S. Cl. .......... 477/127; 477/906; 475/119
(58) Field of Classification Search ............ 477/127, 477/130, 131, 906, 907; 475/116, 119, 120, 475/127, 128
See application file for complete search history.

(56) References Cited

U.S. PATENT DOCUMENTS

| 6,398,684 | B1 | 6/2002 | Kaizu | |
| 2007/0021260 | A1* | 1/2007 | Nozaki et al. | 475/119 |
| 2007/0161448 | A1 | 7/2007 | Sato et al. | |
| 2007/0161449 | A1 | 7/2007 | Hayashi et al. | |
| 2007/0167283 | A1 | 7/2007 | Sato et al. | |
| 2009/0143180 | A1* | 6/2009 | Shimizu et al. | 475/127 |
| 2009/0143181 | A1* | 6/2009 | Shimizu et al. | 475/128 |

FOREIGN PATENT DOCUMENTS

| JP | A-2001-90829 | 4/2001 |
| JP | A-2007-177932 | 7/2007 |
| JP | A 2008-25773 | 2/2008 |

OTHER PUBLICATIONS

International Search Report dated Dec. 1, 2009 for U.S. National Phase Application No. PCT/JP2009/004898.

* cited by examiner

*Primary Examiner* — Roger Pang
(74) *Attorney, Agent, or Firm* — Oliff & Berridge, PLC

(57) ABSTRACT

A hydraulic control apparatus for an automatic transmission includes a first solenoid valve, a second solenoid valve, a third solenoid valve, a preliminary shift speed switch valve, and an oil pressure supply switch valve, which is switched between a normal-state position where the first, second, and third working fluid pressures can be supplied to the hydraulic servos of the first, second, and third friction engagement elements, respectively, and a failure-state position where the first and second preliminary oil pressures can be supplied to the hydraulic servos of the first and second friction engagement elements, respectively, and a line pressure can be supplied to the hydraulic servo of the third friction engagement element, during a failure that causes de-energization.

8 Claims, 4 Drawing Sheets

FIG.2

|   | C-1 | C-2 | C-3 | B-1 | B-2 | F-1 |
|---|---|---|---|---|---|---|
| P |   |   |   |   |   |   |
| REV |   |   | O |   | O |   |
| N |   |   |   |   |   |   |
| 1ST | O |   |   |   | (O) | O |
| 2ND | O |   |   | O |   |   |
| 3RD | O |   | O |   |   |   |
| 4TH | O | O |   |   |   |   |
| 5TH |   | O | O |   |   |   |
| 6TH |   | O |   | O |   |   |

※ (O): ENGINE BRAKE IN OPERATION

US 8,182,397 B2

HYDRAULIC CONTROL APPARATUS FOR AUTOMATIC TRANSMISSION

INCORPORATION BY REFERENCE

The disclosure of Japanese Patent Application No. 2008-255095 filed on Sep. 30, 2008 including the specification, drawings and abstract is incorporated herein by reference in its entirety.

BACKGROUND OF THE INVENTION

The present invention generally relates to hydraulic control apparatuses for automatic transmissions that are mounted on vehicles and the like. More particularly, the present invention relates to hydraulic control apparatuses for automatic transmissions, which enable a shift speed to be attained even in case of a failure that causes de-energization.

In general, in multi-stage automatic transmissions that are mounted on vehicles and the like, each shift speed is formed by controlling the rotating state of each rotary element of a speed change gear mechanism according to the engagement state of a plurality of friction engagement elements. The engagement state of the plurality of friction engagement elements is controlled by electrically regulating an engagement pressure using solenoid valves, and thus, supplying the regulated engagement pressure to respective hydraulic servos of the friction engagement elements.

Incidentally, if a failure in which no electricity is supplied to the solenoid valves, which is a so-called all-solenoids-off state, occurs in such automatic transmissions, electric shift control using the solenoid valves cannot be performed. Such an all-solenoids-off state can be considered to be caused by, for example, failures of a control unit (ECU), disconnections or short-circuits of battery wires, or the like.

On the other hand, when normally open type solenoid valves, which output an oil pressure when being de-energized, are used as the solenoid valves for regulating the engagement pressure to be supplied to the hydraulic servos of the friction engagement elements, the oil pressure can be supplied to the hydraulic servos in the all-solenoids-off state. However, the use of such solenoid valves has the following problem. These solenoid valves do not output the engagement pressure during normal traveling, and thus, often consume electric power. That is, reduction in power consumption is prevented due to the failure-safe function, thereby hindering improvement in fuel economy as a vehicle.

In view of this problem, a hydraulic control apparatus has been proposed, in which all the solenoid valves are formed by normally closed type solenoid valves, where an oil pressure is reversely inputted from exhaust ports of specific solenoid valves (see Japanese Patent Application Publication No. JP-A-2007-177932). This hydraulic control apparatus is structured so that, if, for example, all-solenoids-off failure occurs during traveling, a forward range pressure can be reversely inputted to exhaust ports of linear solenoid valves SLC2, SLC3 that are connected to a second clutch C-2 and a third clutch C-3 that form the seventh forward speed. This improves the fuel economy in a normal state, and also attains the failure-safe function by forming the seventh forward speed in case of the all-solenoids-off failure.

SUMMARY OF THE INVENTION

However, such a structure in which the failsafe mode is attained by reversely inputting an oil pressure to the solenoid valves has a complex oil passage structure, thereby hindering implementation of compact automatic transmissions.

Especially, in hydraulic control apparatuses for automatic transmissions that achieve only the seventh forward speed in the failure-safe state, such as that of Japanese Patent Application Publication No. JP-A-2007-177932, vehicles having high engine power, for example, withstand starting and low-speed traveling even at the seventh forward speed. However, in vehicles, which have low engine power, and thus, may have an engine stop upon starting or during low-speed traveling if it attains only a high shift speed, it is preferable to be able to attain a low shift speed or a high shift speed in the failure-safe state, according to the traveling state of the vehicles. However, in order to attain a different shift speed in the failure-safe state by the reverse input as described above, a more complex oil passage structure is required, thereby increasing the size of the automatic transmissions.

Thus, it is an object of the present invention to provide a hydraulic control apparatus for an automatic transmission, in which solenoid valves for supplying a working fluid pressure to hydraulic servos of friction engagement elements are formed by normally closed type solenoid valves, and one of a low shift speed and a high shift speed can be achieved even in case of all-solenoids-off failure.

According to an aspect of the present invention, in a hydraulic control apparatus for an automatic transmission including: a first solenoid valve capable of supplying a first working fluid pressure to a hydraulic servo of a first friction engagement element; a second solenoid valve capable of supplying a second working fluid pressure to a hydraulic servo of a second friction engagement element; and a third solenoid valve capable of supplying a third working fluid pressure to a hydraulic servo of a third friction engagement element, wherein the second friction engagement element is engaged at higher shift speeds, and the hydraulic control apparatus attains a low shift speed, which is one of lower shift speeds, by engaging the first friction engagement element and the third friction engagement element, and attains a high shift speed, which is one of the higher shift speeds, by engaging the second friction engagement element and the third friction engagement element, the hydraulic control apparatus is characterized in that the first, second, and third solenoid valves are formed by normally closed type solenoid valves that do not output the first, second, and third working fluid pressures when being de-energized, and the hydraulic control apparatus further includes: a preliminary shift speed switch valve, which is switched between a lower shift speed-side position where a first preliminary oil pressure for the hydraulic servo of the first friction engagement element is output, and a higher shift speed-side position where a second preliminary oil pressure for the hydraulic servo of the second friction engagement element is output, based on an engagement state of the second friction engagement element; and an oil pressure supply switch valve, which is switched between a normal-state position where the first, second, and third working fluid pressures can be supplied to the hydraulic servos of the first, second, and third friction engagement elements, respectively, and a failure-state position where the first and second preliminary oil pressures can be supplied to the hydraulic servos of the first and second friction engagement elements, respectively, and a line pressure can be supplied to the hydraulic servo of the third friction engagement element, during a failure that causes de-energization.

Specifically, according to the aspect of the present invention, the hydraulic control apparatus is characterized in that the hydraulic control apparatus further includes a fourth solenoid valve that is formed by a normally open type solenoid valve that is energized during normal traveling, and that outputs a signal oil pressure when being de-energized, and the oil pressure supply switch valve has a first spool, first biasing means for biasing the first spool to the normal-state position, and a first oil chamber for receiving the signal oil pressure of the fourth solenoid valve, and switching the first spool to the failure-state position against a biasing force of the first biasing means.

Moreover, specifically, according to the aspect of the present invention, the hydraulic control apparatus is characterized in that the hydraulic control apparatus further includes a fifth solenoid valve for outputting a signal oil pressure at the lower shift speeds, the preliminary shift speed switch valve has a second spool, second biasing means for biasing the second spool to the lower shift speed-side position, a second oil chamber for receiving an oil pressure of the hydraulic servo of the second friction engagement element, and switching the second spool to the higher shift speed-side position against a biasing force of the second biasing means, a third oil chamber for receiving the second preliminary oil pressure, outputted at the higher shift speed-side position, as a lock pressure, and locking the second spool to the higher shift speed-side position, and a fourth oil chamber for receiving the signal oil pressure of the fifth solenoid valve, and switching the second spool to the lower shift speed-side position, the preliminary shift speed switch valve is switched to the lower shift speed-side position, based on the biasing force of the second biasing means, and the signal oil pressure of the fifth solenoid valve of the fourth oil chamber, and outputs the first preliminary oil pressure, and at the higher shift speeds, the preliminary shift speed switch valve is switched to the higher shift speed-side position, based on an oil pressure of the hydraulic servo of the second friction engagement element of the second oil chamber, and the lock pressure of the third oil chamber, and outputs the second preliminary oil pressure.

Specifically, according to the aspect of the present invention, the hydraulic control apparatus is characterized in that, when a vehicle is restarted upon a failure that causes de-energization, the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

More specifically, according to the aspect of the present invention, the hydraulic control apparatus is characterized in that the hydraulic control apparatus further includes a range switch valve for outputting the line pressure as a forward range pressure in a forward range, and discharging the forward range pressure in other range, the preliminary shift speed switch valve receives the forward range pressure as a source pressure of the first and second preliminary oil pressures, and when the vehicle is restarted upon a failure that causes de-energization, the range switch valve is switched to the other range to discharge the forward range pressure, and then, is switched back to the forward range, whereby the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

According to the aspect of the present invention, the preliminary shift speed switch valve is switched between the lower shift speed-side position where the first preliminary oil pressure for the hydraulic servo of the first friction engagement element is output, and the higher shift speed-side position where the second preliminary oil pressure for the hydraulic servo of the second friction engagement element is output, based on the engagement state of the second friction engagement element, and the oil pressure supply switch valve is switched between the normal-state position where the first, second, and third working fluid pressures can be supplied to the hydraulic servos of the first, second, and third friction engagement elements, respectively, and the failure-state position where the first and second preliminary oil pressures can be supplied to the hydraulic servos of the first and second friction engagement elements, respectively, and the line pressure can be supplied to the hydraulic servo of the third friction engagement element, during a failure that causes de-energization. Thus, the first, second, and third solenoid valves can be formed by normally closed type solenoid valves to reduce power consumption. Thus, one of a low shift speed and a high shift speed can be attained in case of a failure that causes the de-generated state, without complicating the oil passage structure, while enabling fuel economy of a vehicle to be improved. Thus, the failure-safe function can be enhanced.

The hydraulic control apparatus according to the aspect of the present invention includes the fourth solenoid valve that is formed by a normally open type solenoid valve that is energized during normal traveling, and that outputs a signal oil pressure when being de-energized. Thus, the oil pressure supply switch valve can be switched between the normal-state position by the biasing force of the first biasing means, and the failure-state position by the signal oil pressure of the fourth solenoid valve that is inputted to the first oil chamber.

In the hydraulic control apparatus according to the aspect of the present invention, at the lower shift speeds at which the second friction engagement element is not engaged, the second spool of the preliminary shift speed switch valve is switched to the lower shift speed-side position by the biasing force of the second biasing means. At the higher shift speeds at which the second friction engagement element is engaged, the second spool of the preliminary shift speed switch valve is switched to the higher shift speed-side position by an engagement oil pressure of the second friction engagement element of the second oil chamber, against the biasing force of the second biasing means, and is locked by the second preliminary oil pressure of the third oil chamber. Moreover, in the case where the shift speed is shifted from a higher shift speed to a lower shift speed, the second spool of the preliminary shift speed switch valve is switched to the lower shift speed-side position by the signal oil pressure of the fifth solenoid valve of the fourth oil chamber. Thus, the preliminary shift speed switch valve can be structured so as to supply the first preliminary oil pressure to the hydraulic servo of the first friction engagement element when a failure that causes de-energization occurs at any lower shift speed, and so as to supply the second preliminary oil pressure to the hydraulic servo of the second friction engagement element when a failure that causes de-energization occurs at any higher shift speed.

Also, in the hydraulic control apparatus according to the aspect of the present invention, when a vehicle is restarted upon a failure that causes de-energization, the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element. Thus, a low shift speed is attained, enabling restarting of the vehicle.

Further, in the hydraulic control apparatus according to the aspect of the present invention, the preliminary shift speed switch valve receives the forward range pressure as a source pressure of the first and second preliminary oil pressures. Thus, in the case of restarting the vehicle upon a failure that causes de-energization, the range switch valve is switched to other range to discharge the forward range pressure, and then, is switched back to the forward range to supply the first preliminary oil pressure to the hydraulic servo of the first friction engagement element, whereby a low shift speed is attained, enabling restarting of the vehicle. This can eliminate the need for a separate operation, such as temporarily stopping the engine, when, e.g., restarting the vehicle in case of a failure that causes de-energization.

BRIEF DESCRIPTION OF THE DRAWINGS

FIG. 2 is an engagement table of the automatic transmission;

DETAILED DESCRIPTION OF THE EMBODIMENT

Hereinafter, an embodiment of the present invention will be described with reference to FIGS. 1 through 4.

[Schematic Structure of Automatic Transmission]

Figure 1:
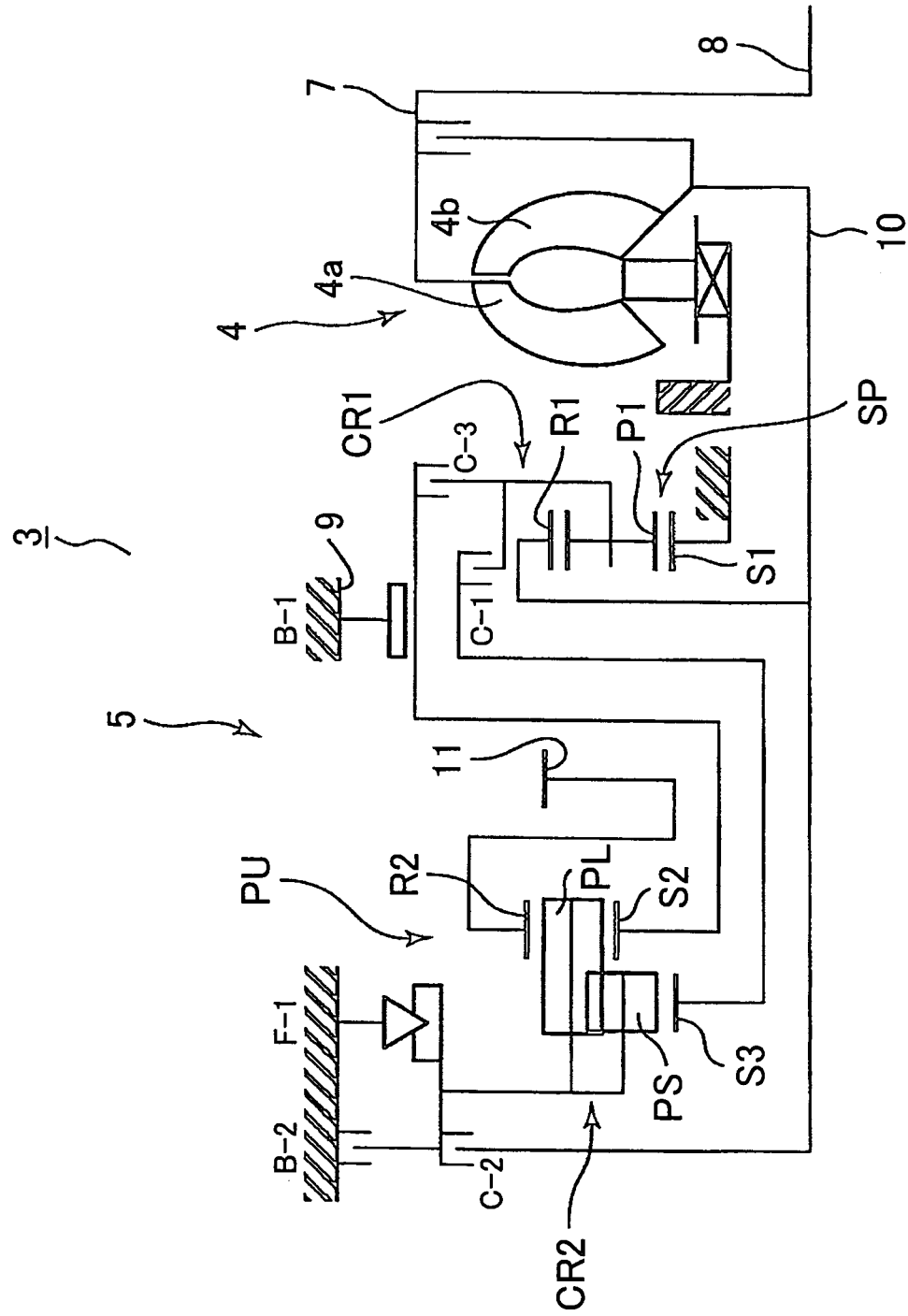
FIG. 1 is a skeleton diagram showing an automatic transmission according to the present invention.

First, a schematic structure of an automatic transmission 3 to which the present invention can be applied will be described with reference to FIG. 1. As shown in FIG. 1, the automatic transmission 3, which is preferably used in, e.g., FF type (front engine, front drive) vehicles, has an input shaft 8 of the automatic transmission 3, which can be connected to an engine (not shown), and includes a torque converter 4 and an automatic speed change mechanism 5, which are disposed about an axial direction of the input shaft 8.

The torque converter 4 has a pump impeller 4a connected to the input shaft 8 of the automatic transmission 3, and a turbine runner 4b to which rotation of the pump impeller 4a is transmitted via a working fluid. The turbine runner 4b is connected to an input shaft 10 of the automatic speed change mechanism 5 disposed coaxially with the input shaft 8. Moreover, the torque converter 4 includes a lock-up clutch 7, and when the lock-up clutch 7 is engaged, rotation of the input shaft 8 of the automatic transmission 3 is directly transmitted to the input shaft 10 of the automatic speed change mechanism 5.

The automatic speed change mechanism 5 includes a planetary gear SP and a planetary gear unit PU on the input shaft 10. The planetary gear SP is a so-called single-pinion planetary gear, which includes a sun gear S1, a carrier CR1, and a ring gear R1, and which has a pinion P1, which meshes with the sun gear S1 and the ring gear R1, on the carrier CR1.

Moreover, the planetary gear unit PU is a so-called Ravigneaux type planetary gear, which has a sun gear S2, a sun gear S3, a carrier CR2, and a ring gear R2 as four rotary elements, and which has a long pinion PL meshing with the sun gear S2 and the ring gear R2, and a short pinion PS meshing with the sun gear S3, on the carrier CR2 so that the long pinion PL and the short pinion PS mesh with each other.

The sun gear S1 of the planetary gear SP is connected to a boss portion, not shown, which is integrally fixed to a transmission case 9, so that the sun gear S1 is held stationary. Moreover, the ring gear R1 provides the same rotation as that of the input shaft 10 (hereinafter referred to as the "input rotation"). Furthermore, the carrier CR1 provides reduced rotation, resulting from reduction of the input rotation, by the sun gear S1 that is held stationary and the ring gear R1 that provides the input rotation. The carrier CR1 is connected to a clutch C-1 (a first friction engagement element) and a clutch C-3 (a third friction engagement element).

The sun gear S2 of the planetary gear unit PU is connected to a brake B-1, which is formed by a band brake, so that the sun gear S2 can be freely held stationary to the transmission case 9. The sun gear S2 of the planetary gear unit PU is connected also to the clutch C-3 so that the reduced rotation of the carrier CR1 can be freely inputted to the sun gear S2 via the clutch C-3. Moreover, the sun gear S3 is connected to the clutch C-1 so that the reduced rotation of the carrier CR1 can be freely inputted to the sun gear S3.

Furthermore, the carrier CR2 is connected to a clutch C-2 (a second friction engagement element) to which the rotation of the input shaft 10 is inputted, so that the input rotation can be freely inputted to the carrier CR2 via the clutch C-2. The carrier CR2 is connected also to a one-way clutch F-1 and a brake B-2, so that rotation of the carrier CR2 in one direction to the transmission case 9 is restricted via the one-way clutch F-1, and that the carrier CR2 can be freely held stationary via the second brake B-2. Moreover, the ring gear R2 is connected to a counter gear 11, and the counter gear 11 is connected to driving wheels through a counter shaft and a differential unit, which are not shown.

[Operation at Each Shift Speed in Automatic Transmission]

Figure 3:
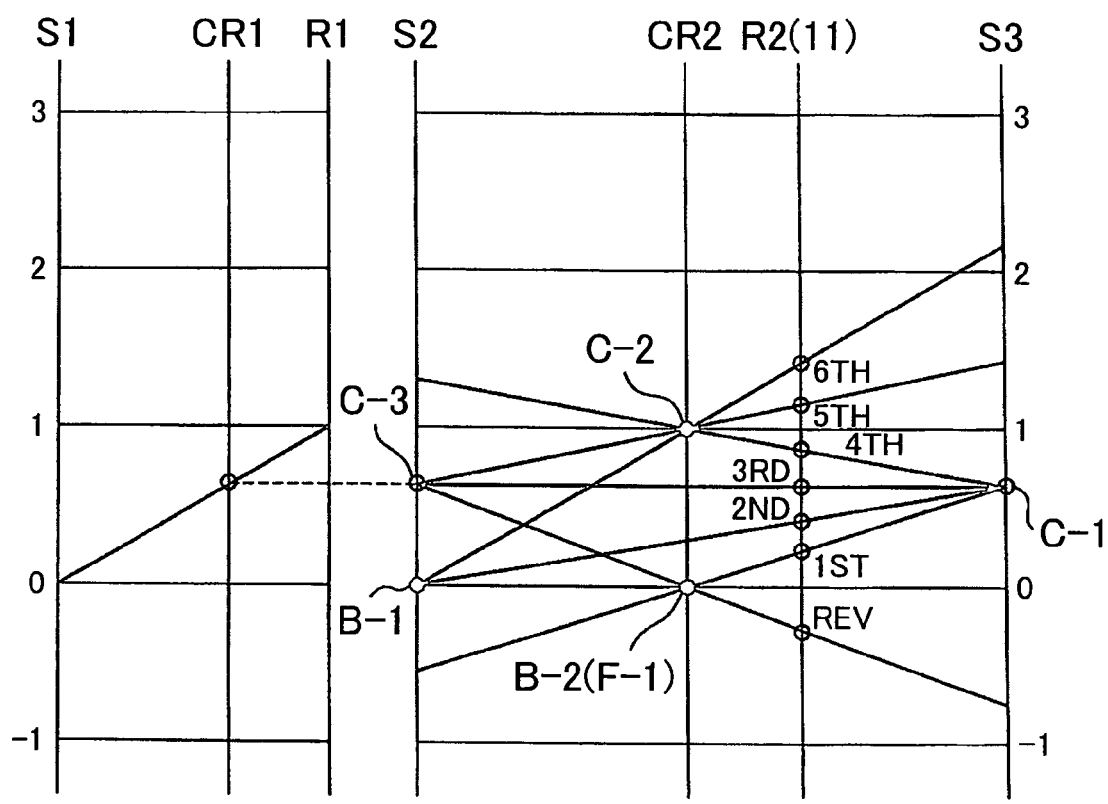
FIG. 3 is a velocity diagram of the automatic transmission.

Next, based on the above structure, functions of the automatic speed change mechanism 5 will be described with reference to FIGS. 1, 2, and 3. Note that, in the velocity diagram shown in FIG. 3, the vertical axis direction indicates the rotational speeds of the rotary elements (each gear), and the horizontal axis direction indicates the correspondence with the gear ratios of the rotary elements. Moreover, in the part of the velocity diagram which shows the planetary gear SP, the vertical axes respectively correspond to the sun gear S1, the carrier CR1, and the ring gear R1, sequentially from the left side in FIG. 3. Furthermore, in the part of the velocity diagram which shows the planetary gear unit PU, the vertical axes respectively correspond to the sun gear S3, the ring gear R2, the carrier CR2, and the sun gear S2, sequentially from the right side in FIG. 3.

For example, in the D (drive) range and at the first forward speed (1ST), as shown in FIG. 2, the clutch C-1 and the one-way clutch F-1 are engaged. Thus, as shown in FIGS. 1 and 3, rotation of the carrier CR1, which provides the reduced rotation by the sun gear S1 that is held stationary and the ring gear R1 that provides the input rotation, is inputted to the sun gear S3 via the clutch C-1. Moreover, rotation of the carrier CR2 is restricted to one direction (a normal rotation direction). That is, reverse rotation of the carrier CR2 is prevented, and the carrier CR2 is held stationary. Thus, the reduced rotation, inputted to the sun gear S3, is outputted to the ring gear R2 via the carrier CR2 that is held stationary, whereby normal rotation as the first forward speed is outputted from the counter gear 11.

Note that, during engine braking (during coasting), the carrier CR2 is held stationary by latching the brake B-2, whereby the state of the first forward speed is maintained by preventing normal rotation of the carrier CR2. Moreover, at the first forward speed, the one-way clutch F-1 prevents reverse rotation of the carrier CR2, and enables normal rotation thereof. Thus, when the drive range is switched, for example, from a non-traveling range to a traveling range, the first forward speed can be smoothly attained by automatic engagement of the one-way clutch F-1.

At the second forward speed (2ND), as shown in FIG. 2, the clutch C-1 is engaged, and the brake B-1 is latched. Thus, as shown in FIGS. 1 and 3, rotation of the carrier CR1, which provides the reduced rotation by the sun gear S1 that is held stationary and the ring gear R1 that provides the input rotation, is inputted to the sun gear S3 via the clutch C-1. Moreover, since the brake B-1 is latched, the sun gear S2 is held stationary. Thus, the carrier CR2 provides reduced rotation having a lower rotational speed than that of the rotation of the sun gear S3, and the reduced rotation, inputted to the sun gear S3, is outputted to the ring gear R2 via the carrier CR2, whereby normal rotation as the second forward speed is outputted from the counter gear 11.

At the third forward speed (3RD), as shown in FIG. 2, the clutch C-1 and the clutch C-3 are engaged. Thus, as shown in FIGS. 1 and 3, rotation of the carrier CR1, which provides the reduced rotation by the sun gear S1 that is held stationary and the ring gear R1 that provides the input rotation, is inputted to the sun gear S3 via the clutch C-1. Moreover, since the clutch C-3 is engaged, the reduced rotation of the carrier CR1 is inputted to the sun gear S2. That is, since the reduced rotation of the carrier CR1 is inputted to the sun gear S2 and the sun gear S3, the planetary gear unit PU becomes directly connected to the reduced rotation, and the reduced rotation is outputted as it is to the ring gear R2, whereby normal rotation as the third forward speed is outputted from the counter gear 11.

At the fourth forward speed (4TH), as shown in FIG. 2, the clutch C-1 and the clutch C-2 are engaged. Thus, as shown in FIGS. 1 and 3, rotation of the carrier CR1, which provides the reduced rotation by the sun gear S1 that is held stationary and the ring gear R1 that provides the input rotation, is inputted to the sun gear S3 via the clutch C-1. Moreover, since the clutch C-2 is engaged, the input rotation is inputted to the carrier CR2. Thus, reduced rotation, having a higher rotational speed than that of the third forward speed, is obtained by the reduced rotation inputted to the sun gear S3, and the input rotation inputted to the carrier CR2. This reduced rotation is outputted to the ring gear R2, whereby normal rotation as the fourth forward speed is outputted from the counter gear 11.

At the fifth forward speed (5TH), as shown in FIG. 2, the clutch C-2 and the clutch C-3 are engaged. Thus, as shown in FIGS. 1 and 3, rotation of the carrier CR1, which provides the reduced rotation by the sun gear S1 that is held stationary and the ring gear R1 that provides the input rotation, is inputted to the sun gear S2 via the clutch C-3. Moreover, since the clutch C-2 is engaged, the input rotation is inputted to the carrier CR2. Thus, increased rotation, having a slightly higher rotational speed than that of the input rotation, is obtained by the reduced rotation inputted to the sun gear S2, and the input rotation inputted to the carrier CR2. This increased rotation is outputted to the ring gear R2, whereby normal rotation as the fifth forward speed is outputted from the counter gear 11.

At the sixth forward speed (6TH), as shown in FIG. 2, the clutch C-2 is engaged, and the brake B-1 is latched. Thus, as shown in FIGS. 1 and 3, since the clutch C-2 is engaged, the input rotation is inputted to the carrier CR2. Moreover, since the brake B-1 is latched, the sun gear S2 is held stationary. Thus, the input rotation of the carrier CR2 becomes increased rotation, having a higher rotational speed than that of the fifth forward speed, by the sun gear S2 that is held stationary. This increased rotation is outputted to the ring gear R2, whereby normal rotation as the sixth forward speed is outputted from the counter gear 11.

At the first reverse speed (REV), as shown in FIG. 2, the clutch C-3 is engaged, and the brake B-2 is latched. Thus, as shown in FIGS. 1 and 3, rotation of the carrier CR1, which provides the reduced rotation by the sun gear S1 that is held stationary and the ring gear R1 that provides the input rotation, is inputted to the sun gear S2 via the clutch C-3. Moreover, since the brake B-2 is latched, the carrier CR2 is held stationary. Thus, the reduced rotation, inputted to the sun gear S2, is outputted to the ring gear R2 through the carrier CR2 that is held stationary, whereby reverse rotation as the first reverse speed is outputted from the counter gear 11.

Note that, in, e.g., the P (parking) range and the N (neutral) range, the clutch C-1, the clutch C-2, and the clutch C-3 are released. Thus, the carrier CR1, and the sun gears S2 and S3 are disconnected from each other, that is, the planetary gear SP and the planetary gear unit PU are disconnected from each other. Moreover, the input shaft 10 and the carrier CR2 are disconnected from each other. Thus, power transmission between the input shaft 10 and the planetary gear unit PU is disconnected, that is, power transmission between the input shaft 10 and the counter gear 11 is disconnected.

[Schematic Structure of Hydraulic Control Apparatus]

Next, the hydraulic control apparatus 1 for the automatic transmission according to the present invention will be described below. First, portions, not shown, for generating a line pressure, a secondary pressure, a modulator pressure, a range pressure, and the like in the hydraulic control apparatus 1 will be roughly described. Note that the portions for generating the line pressure, the secondary pressure, the modulator pressure, and the range pressure are similar to those of common hydraulic control apparatuses for automatic transmissions, and are well-known in the art. Thus, these portions will be described briefly.

The hydraulic control apparatus 1 includes an oil pump, a manual shift valve, a primary regulator valve, a secondary regulator valve, a solenoid modulator valve, a linear solenoid valve SLT, and the like, which are now shown. For example, when the engine is started, the oil pump, which is drivingly connected to the pump impeller 4a of the torque converter 4, is driven with rotation of the engine to pump up oil from an oil pan, not shown, through a strainer, thereby generating an oil pressure.

The oil pressure generated by the oil pump is discharged and adjusted by the primary regulator valve, based on a signal pressure $P_{SLT}$ of the linear solenoid valve SLT, which is regulated and outputted according to the throttle opening degree, whereby this oil pressure is regulated to a line pressure $P_L$. This line pressure $P_L$ is supplied to the manual shift valve (a range switch valve), the solenoid modulator valve, a linear solenoid valve SLC3 that will be described in detail below, and the like. The line pressure $P_L$ supplied to the solenoid modulator valve is regulated to a modulator pressure $P_{MOD}$, which becomes a substantially constant pressure, by this valve, and this modulator pressure $P_{MOD}$ is supplied as a source pressure of the linear solenoid valve SLT, solenoid valves S1, S2 that will be described below, and the like.

Note that the pressure discharged from the primary regulator valve is further regulated and adjusted by, e.g., the secondary regulator valve, whereby this pressure is regulated to a secondary pressure $P_{SEC}$. This secondary pressure $P_{SEC}$ is supplied to, e.g., a lubricating oil passage, an oil cooler, and the like, and is supplied also to the torque converter 4. This secondary pressure $P_{SEC}$ is also used to control the lockup clutch 7.

On the other hand, the manual shift valve (not shown) has a spool, which is mechanically (or electrically) driven by a shift lever that is provided at the driver's seat (not shown). The manual shift valve sets an outputting state and a non-outputting state (drain) of the input line pressure $P_L$ by switching the spool position according to a shift range (e.g., P, R, N, D) selected by the shift lever.

More specifically, when the shift position is set to the D range based on the shift lever operation, an input port, to which the line pressure $P_L$ is inputted, and a forward range pressure output port communicate with each other based on the spool position, whereby the line pressure $P_L$ is outputted as a forward range pressure (a D range pressure) $P_D$ from the forward range pressure output port. When the shift position is set to the R (reverse) range based on the shift lever operation, the input port and a reverse range pressure output port communicate with each other based on the spool position, and the line pressure $P_L$ is outputted as a reverse range pressure (an R range pressure) $P_{REV}$ from the reverse range pressure output port. Moreover, when the shift position is set to the P range and the N range based on the shift lever operation, the input port, and the forward range pressure output port and the reverse range pressure output port are disconnected from each other by the spool, and the forward range pressure output port and the reverse range pressure output port communicate with a drain port. That is, the non-outputting state, where the D range pressure $P_D$ and the R range pressure $P_{REV}$ are drained (discharged), is attained.

[Detailed Structure of Shift Control Portion in Hydraulic Control Apparatus]

Next, a portion, which mainly performs shift control, in the hydraulic control apparatus 1 of the present invention will be described with reference to FIG. 4. Note that, in the present embodiment, in order to explain the spool position, the position in the right half in FIG. 4 is herein referred to as the "right-half position," and the position in the left half in FIG. 4 is referred to as the "left-half position."

The hydraulic control apparatus 1 includes four linear solenoid valves SLC1, SLC2, SLC3, SLB1 for directly supplying an output pressure, regulated as an engagement pressure, to five hydraulic servos, that is, a hydraulic servo 41 of the clutch C-1, a hydraulic servo 42 of the clutch C-2, a hydraulic servo 43 of the clutch C-3, a hydraulic servo 44 of the brake B-1, and a hydraulic servo 45 of the brake B-2. The hydraulic control apparatus 1 further includes, as a portion that attains a limp home function and is switched so as to supply an output pressure of the linear solenoid valve SLC2 to the hydraulic servo 42 of the clutch C-2 or the hydraulic servo 45 of the brake B-2, a solenoid valve S1, a solenoid valve S2, a first clutch apply relay valve 21, a second clutch apply relay valve 22, a C-2 relay valve 23, a B-2 relay valve 24, and the like.

Figure 4:
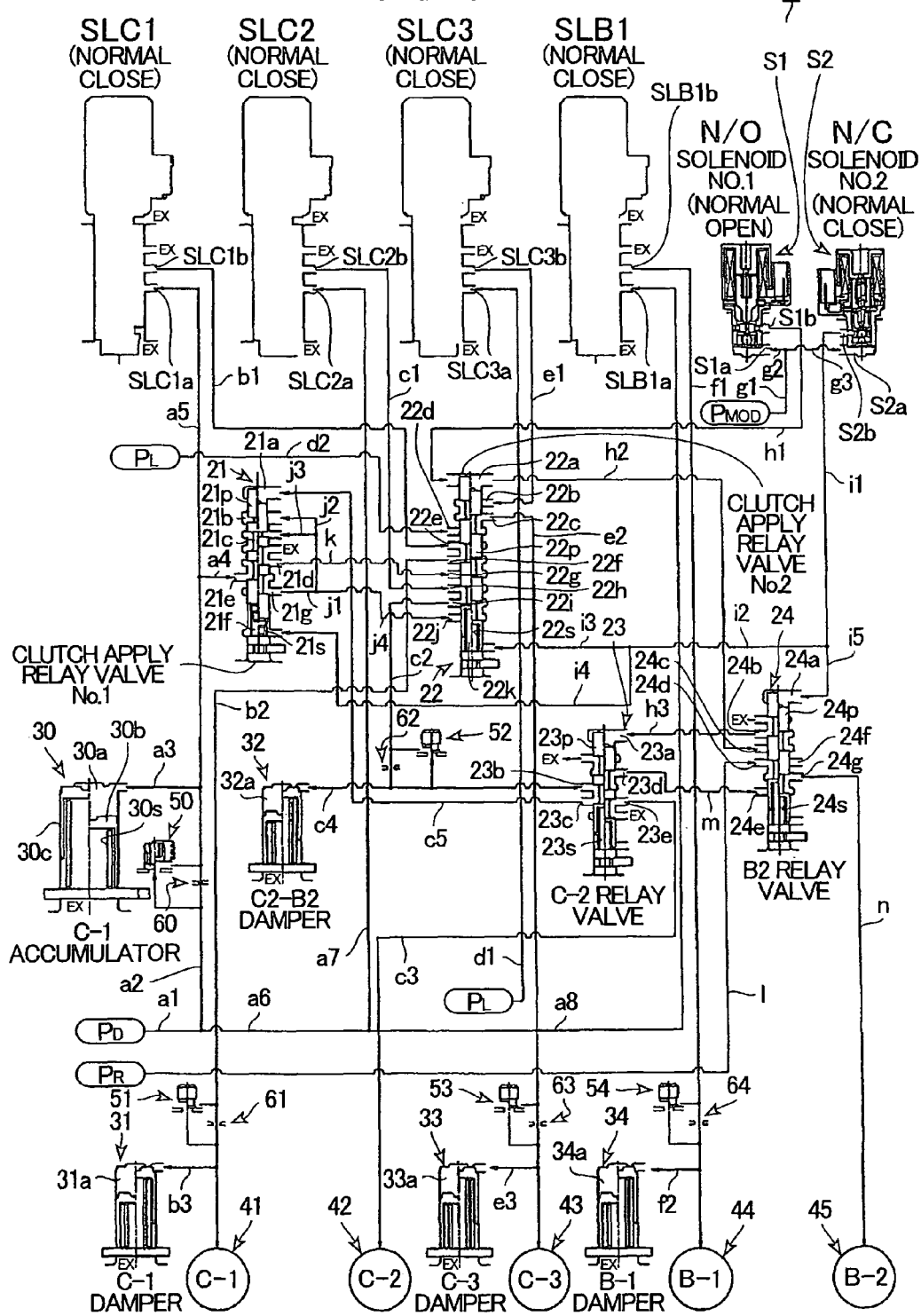
FIG. 4 is a circuit diagram showing a hydraulic control apparatus of the automatic transmission according to the present invention.

The forward range pressure output port (not shown) of the manual shift valve described above is connected to oil passages a1 through a8 shown in FIG. 4, so that the forward range pressure $P_D$ can be inputted to the oil passages a1 through a8. Moreover, the reverse range pressure output port (not shown) of the manual shift valve is connected to an oil pressure 1 so that the reverse range pressure $P_{REV}$ can be inputted to the oil passage 1. Moreover, the line pressure $P_L$ from the primary regulator valve (not shown) is inputted to oil passages d1 through d2, and the modulator pressure $P_{MOD}$ from the modulator valve (not shown) is inputted to oil passages g1 through g3.

Of the above oil passages, the oil passage a1 is connected to an input port 21e of the first clutch apply relay valve 21, which will be described in detail below, through the oil passages a2, a4, and a check valve 50 and an orifice 60 are provided in the oil passage a1. Moreover, the oil passage a1 is connected to an accumulator 30 through the oil passage a3, and is connected to the linear solenoid valve SLC1 through the oil passage a5.

The accumulator 30 has a case 30c, a piston 30b provided inside the case 30c, a spring 30s for biasing the piston 30b, and an oil chamber 30a formed between the case 30c and the piston 30b.

The linear solenoid valve (the first solenoid valve) SLC1 is of a normally closed type that attains an outputting state when being energized, and has an input port SLC1a for receiving the forward range pressure $P_D$ through the oil passage a5, and an output port SLC1b for regulating the forward range pressure $P_D$ to output a control pressure (a first working fluid pressure) $P_{SLC1}$ to the hydraulic servo 41 as an engagement pressure $P_{C1}$. That is, the linear solenoid valve SLC1 is structured so that, when being de-energized, the linear solenoid valve SLC1 disconnects the input port SLC1a and the output port SLC1b from each other to attain a non-outputting state, and so that, when being energized based on a command value from a control unit (ECU), not shown, the linear solenoid valve SLC1 increases the communication amount between the input port SLC1a and the output port SLC1b (the opening amount) according to the command value, that is, can output an engagement pressure $P_{C1}$ according to the command value. Moreover, the output port SLC1b of the linear solenoid valve SLC1 is connected to an input port 22e of the second clutch apply relay valve 22, described below, through an oil passage b1.

On the other hand, the linear solenoid valve (the second solenoid valve) SLC2 is of a normally closed type that attains an outputting state when being energized, and has an input port SLC2a for receiving the forward range pressure $P_D$ through the oil passage a7 and the like, and an output port SLC2b for regulating the forward range pressure $P_D$ to output a control pressure (a second working fluid pressure) $P_{SLC2}$ to the hydraulic servo 42 as an engagement pressure $P_{C2}$ (or an engagement pressure $P_{B2}$). That is, the linear solenoid valve SLC2 is structured so that, when being de-energized, the linear solenoid valve SLC2 attains a non-outputting state where the input port SLC2a and the output port SLC2b are disconnected from each other, and so that, when being energized based on a command value from the control unit (ECU), not shown, the linear solenoid valve SLC2 increases the communication amount between the input port SLC2a and the output port SLC2b (the opening amount) according to the command value, that is, can output an engagement pressure $P_{C2}$ (or $P_{B2}$) according to the command value. Moreover, the output port SLC2b of the linear solenoid valve SLC2 is connected to an input port 22h of the second clutch apply relay valve 22, described below, through an oil passage c1.

The linear solenoid valve (the third solenoid valve) SLC3 is of a normally closed type that attains an outputting state when being energized, and has an input port SLC3a for receiving the line pressure $P_L$ through the oil passage d1, and an output port SLC3b for regulating the line pressure $P_L$ to output a control pressure (a third working fluid pressure) $P_{SLC3}$ to the hydraulic servo 43 as an engagement pressure $P_{C3}$. That is, the linear solenoid valve SLC3 is structured so that, when being de-energized, the linear solenoid valve SLC3 attains a non-outputting state where the input port SLC3a and the output port SLC3b are disconnected from each other, and so that, when being energized based on a command value from the control unit (ECU), not shown, the linear solenoid valve SLC3 increases the communication amount between the input port SLC3a and the output port SLC3b (the opening amount) according to the command value, that is, can output an engagement pressure $P_{C3}$ according to the command value. Moreover, the output port SLC3b of the linear solenoid valve SLC3 is connected to an input port 22b of the second clutch apply relay valve 22, described below, through an oil passage e1.

The linear solenoid valve SLB1 is of a normally closed type that attains a non-outputting state when being de-energized, and has an input port SLB1a for receiving the forward range pressure $P_D$ through the oil passage a8 and the like, and an output port SLC1b for regulating the line forward range pressure $P_D$ to output a control pressure $P_{SLB1}$ to the hydraulic servo 44 as an engagement pressure $P_{B1}$. That is, the linear solenoid valve SLB1 is structured so that, when being de-energized, the linear solenoid valve SLB1 attains a non-outputting state where the input port SLB1a and the output port SLB1b are disconnected from each other, and so that, when being energized based on a command value from the control unit (ECU), not shown, the linear solenoid valve SLB1 increases the communication amount between the input port SLB1a and the output port SLB1b (the opening amount) according to the command value, that is, can output an engagement pressure $P_{B1}$ according to the command value. Moreover, the output port SLB1b of the linear solenoid valve SLB1 is connected to the hydraulic servo 44 of the brake B-1 through an oil passage f1. Moreover, a check valve 54 and an orifice 64 are provided in the oil passage f1, and an oil chamber 34a of a B-1 damper 34 is connected to the oil passage f1 through the oil passage f2.

The solenoid valve (the fourth solenoid valve) S1 is of a normally open type that attains an outputting state when being de-energized, and has an input port S1a for receiving the modulator pressure $P_{MOD}$ through the oil passages g1, g2, and an output port S1b for outputting the modulator pressure $P_{MOD}$ substantially as it is as a signal pressure $P_{S1}$ when being de-energized (that is, when being OFF). The output port S1b is connected to an oil chamber 22a of the second clutch apply relay valve 22 through an oil passage h1, and also, is connected to an input port 24c of the B-2 relay valve 24 through an oil passage h2.

The solenoid valve (the fifth solenoid valve) S2 is of a normally closed type that attains a non-outputting state when being de-energized, and has an input port S2a for receiving the modulator pressure $P_{MOD}$ through the oil passages g1, g3, and an output port S2b for outputting the modulator pressure $P_{MOD}$ substantially as it is as a signal pressure $P_{S2}$ when being energized (that is, when being ON). The output port S2b is connected to an oil chamber 22k of the second clutch apply relay valve 22 through oil passages i1, i2, i3, and also, is connected to an oil chamber 21f of the first clutch apply relay valve 21 through an oil passage i4, and is connected to an oil chamber 24a of the B-2 relay valve 24 through an oil passage i5.

The first clutch apply relay valve (a preliminary shift speed switch valve) 21 has a spool (a second spool) 21p, and a spring (second biasing means) 21s for biasing the spool 21p upwards in the figure, and has an oil chamber (a second oil chamber) 21a located above the spool 21p in the figure, an oil chamber (a fourth oil chamber) 21f located under the spool 21p in the figure, and oil chambers (third oil chambers) 21b, 21c formed by the difference in diameter (the difference in pressure-receiving area) between land portions of the spool 21p. The first clutch apply relay valve 21 further has an input port 21e, an output port 21d, an output port 21g, and a drain port EX.

The first clutch apply relay valve 21 is structured so that, when the spool 21p is set to the left-half position (a lower shift speed-side position), the input port 21e and the output port 21d communicate with each other, and the input port 21e and the output port 21g are disconnected from each other, and so that, when the spool 21p is set to the right-half position (a higher shift speed-side position), the input port 21e and the output port 21g communicate with each other, and the output port 21d and the drain port EX communicate with each other.

The forward range pressure $P_D$ is inputted to the input port 21e through the oil pressure a4 and the like. The output port 21d, which communicates with the input port 21e when the spool 21p is at the left half position, is connected to an input port 22g of the second clutch apply relay valve 22 through an oil passage k. Moreover, the output port 21g, which communicates with the input port 21e when the spool 21p is at the right half position, is connected to an input port 22j of the second clutch apply relay valve 22 through an oil passage j1, and is connected to the oil chambers 21b, 21c through oil passages j2, j3. Moreover, the oil chamber 21a is connected to the hydraulic servo 42 of the clutch C-2 through an oil passage c5 and the C-2 relay valve 23. That is, in a normal state, the oil chamber 21a is connected to the output port SLC2b of the linear solenoid valve SLC2 through the second clutch apply relay valve 22. Moreover, the oil chamber 21f is connected to the output port S2b of the solenoid valve S2 through the oil passage i4 and the like.

The second clutch apply relay valve (an oil pressure supply switch valve) 22 has a spool (a first spool) 22p, and a spring (first biasing means) 22s for biasing the spool 22p upwards in the figure, and also, has an oil chamber (a first oil chamber) 22a located above the spool 22p in the figure, and an oil chamber 22k located under the spool 22p in the figure. The second clutch apply relay valve 22 further has an input port 22b, an output port 22c, an input port 22d, an input port 22e, an output port 22f, an input port 22g, an input port 22h, an output port 22i, and an input port 22j.

The second clutch apply relay valve 22 is structured so that, when the spool 22p is set to the left-half position (a normal-state position), the input port 22b and the output port 22c communicate with each other and the input port 22d is disconnected, the input port 22e and the output port 22f communicate with each other and the input port 22g is disconnected, and also, the input port 22h and the output port 22i communicate with each other and the input port 22j is disconnected. Moreover, the second clutch apply relay valve 22 is structured so that, when the spool 22p is set to the right-half position (a failure-state position), the input port 22d and the output port 22c communicate with each other and the input port 22b is disconnected, the input port 22g and the output port 22f communicate with each other and the input port 22e is disconnected, and also, the input port 22j and the output port 22i communicate with each other and the input port 22h is disconnected.

As described above, the oil chamber 22a is connected to the output port S1b of the solenoid valve S1 through the oil passage h1, and is connected to the input port 24c of the B-2 relay valve 24, described below, through the oil passage h2. On the other hand, the oil chamber 22k is connected to the output port S2b of the solenoid valve S2 through the oil passage i3 or the like.

Moreover, the input port 22b is connected to the output port SLC3b of the linear solenoid valve SLC3 through the oil passage e1, and the line pressure $P_L$ is inputted to the input port 22d through the oil passage d2. Moreover, the output port 22c, which communicates with the input port 22b when the spool 22p is set to the left-half position, and communicates with the input port 22d when the spool 22p is set to the right-half position, is connected to the hydraulic servo 43 of the clutch C-3 through an oil passage e2. Note that a check valve 53 and an orifice 63 are provided in the oil passage e2, and an oil chamber 33a of a C-3 damper 33 is connected to the oil passage e2 through an oil passage e3. Since the C-3 damper 33 has a structure similar to that of the accumulator 30 described above, and is a common damper apparatus, detailed description thereof will be omitted.

Similarly, the input port 22e is connected to the output port SLC1b of the linear solenoid valve SLC1 through the oil passage b1, and the input port 22g is connected to the output port 21d of the first clutch apply relay valve 21 through the oil passage k. Moreover, the output port 22f, which communicates with the input port 22e when the spool 22p is set to the left-half position, and communicates with the input port 22g when the spool 22p is set to the right-half position, is connected to the hydraulic servo 41 of the clutch C-1 through an oil passage b2. A check valve 51 and an orifice 61 are provided in the oil passage b2, and an oil chamber 31a of a C-1 damper 31 is connected to the oil passage b2 through an oil passage b3.

Similarly, the input port 22h is connected to an output port SLC2b of the linear solenoid valve SLC2 through the oil passage c1, and the input port 22j is connected to the output port 21g of the first clutch apply relay valve 21 through an oil passage j4. Moreover, the output port 22i, which communicates with the input port 22h when the spool 22p is located at the left-half position, and communicates with the input port 22j when the spool 22p is located at the right-half position, is connected to an input port 23b of a C-2 relay valve 23, described below, through an oil passage c2. A check valve 52 and an orifice 62 are provided in the oil chamber c2, and an oil chamber 32a of a C2-B2 damper 32 is connected to the oil passage c2 through an oil passage c4.

The C-2 relay valve 23 has a spool 23p, and a spring 23s for biasing the spool 23p upwards in the figure, and also has an oil chamber 23a above the spool 23p in the figure. The C-2 relay valve 23 further has an input port 23b, an output port 23c, an output port 23d, an output port 23e, and a drain port EX.

The C-2 relay valve 23 is structured so that the input port 23b, and the output port 23c and the output port 23e communicate with each other and the output port 23d and the drain port EX communicate with each other, when the spool 23p is set to the left-half position, and so that the input port 23b and the output port 23d communicate with each other and the output port 23c and the output port 23e, and the drain port EX communicate with each other when the spool 23p is set to the right-half position.

The oil chamber 23a is connected to an output port 24b of the B-2 relay valve 24, described below, through an oil passage h3. The input port 23b is connected to the output port 22i of the second clutch apply relay valve 22 through the oil passage c2, and the output port 23e, which communicates with the input port 23b when the spool 23p is set to the left-half position, is connected to the hydraulic servo 42 of the clutch C-2 through an oil passage c3. Moreover, similarly, the output port 23c, which communicates with the input port 23b when the spool 23p is set to the left-half position, is connected to the oil chamber 21a of the first clutch apply relay valve 21 through the oil passage c5. Moreover, the output port 23d, which communicates with the input port 23b when the spool 23p is set to the right-half position, is connected to an input port 24e of the B-2 relay valve 24 through an oil passage m.

The B-2 relay valve 24 has a spool 24p, and a spring 24s for biasing the spool 24p upwards in the figure, and also has an oil chamber 24a above the spool 24p in the figure. The B-2 relay valve 24 further has an output port 24b, an input port 24c, an input port 24d, an input port 24e, an output port 24f, an output port 24g, and a drain port EX.

The B-2 relay valve 24 is structured so that the input port 24d, and the output port 24f and the output port 24g communicate with each other, the output port 24b and the drain port EX communicate with each other, and the input port 24c is disconnected, when the spool 24p is set to the left-half position, and so that the input port 24c and the output port 24b communicate with each other, the input port 24e and the output port 24g communicate with each other, and the input port 24d and the drain port EX are disconnected from each other, when the spool 24p is set to the right-half position.

The oil chamber 24a is connected to the output port S2b of the solenoid valve S2 through the oil passage i5 and the like. The input port 24d is connected to the reverse range pressure output port (not shown) of the manual shift valve, for outputting the reverse range pressure $P_{REV}$, through the oil passage 1. Moreover, the input port 24e is connected to the output port 23d of the C-2 relay valve 23 through the oil passage m. The output port 24g, which communicates with the input port 24d when the spool 24p is set to the left-half position, and communicates with the input port 24e when the spool 24p is set to the right-half position, is connected to the hydraulic servo 45 of the brake B-2 through an oil passage n. That is, the hydraulic servo 45 of the brake B-2 is connected to the reverse range pressure output port (not shown) of the manual shift valve, or the output port SLC2b of the linear solenoid valve SLC2. Moreover, as described above, the input port 24c is connected to the output port S1b of the solenoid valve S1 through the oil passage h2, the oil chamber 22a of the second clutch apply relay valve 22, and the oil passage h1, and the output port 24b, which communicates with the input port 24c when the spool 24p is set to the right-half position, is connected to the oil chamber 23a of the C-2 relay valve 23 through the oil passage h3. Note that, the output port 24f, which communicates with the input port 24d when the spool 24p is set to the left-half position, is connected to an oil chamber of the primary regulator valve through an oil passage, not shown, so as to apply the reverse range pressure $P_{REV}$ to the primary regulator valve to increase the line pressure $P_L$ during reverse traveling.

[Operation of Hydraulic Control Apparatus]

Next, functions of the hydraulic control apparatus 1 of the present embodiment will be described.

Hydraulic control of the hydraulic control apparatus 1 is started when, for example, a driver turns on the ignition. First, the selected shift lever position is, e.g., the P range or the N range, the normally open type solenoid valve S1 is energized according to an electric command of the control unit, not shown, to disconnect the input port S1a and the output port S1b of the solenoid valve S1 from each other. Then, when, for example, the engine is started, an oil pressure is generated by rotation of the oil pump (not shown) which is based on the engine rotation. This oil pressure is regulated to a line pressure $P_L$ and a modulator pressure $P_{MOD}$ for output, by the primary regulator valve and the solenoid modulator valve as described above, respectively, whereby the line pressure $P_L$ is inputted to the input port of the manual shift valve, not shown, and to the input port SLC3a of the linear solenoid valve SLC3 through the oil passage d1, and also, the modulator pressure $P_{MOD}$ is inputted to the input ports S1a, S2a of the solenoid valves S1, S2 through the oil passages g1, g2, g3.

Then, for example, if the driver shifts the shift lever from the N range position to the D range position, the solenoid valve S2 is turned on, and the modulator pressure $P_{MOD}$, inputted to the input port S2a through the oil passages g1, g3, is outputted as a signal pressure $P_{S2}$ from the output port S2b to the oil passages i1 through i5. Moreover, a forward range pressure $P_D$ is outputted from the forward range pressure output port of the manual shift valve (not shown) to the oil passages a1 through a8, and the forward range pressure $P_D$ is inputted to the linear solenoid valve SLC1 through the oil passage a5, to the linear solenoid valve SLC2 through the oil passage a7, to the linear solenoid valve SLB1 through the oil pressure a8, and to the first clutch apply relay valve 21 through the oil passage a4.

The check valve 50 and the orifice 60 are provided in the oil passage a2. Since the check valve 50 is opened by the forward range pressure $P_D$, the forward range pressure $P_D$ is supplied to the linear solenoid valve SLC1 more rapidly than when discharging the forward range pressure $P_D$. Moreover, the forward range pressure $P_D$, supplied to the oil passage a2, is inputted to the oil chamber 30a of the accumulator 30 through the oil passage a3, and the accumulator 30 accumulates the forward range pressure $P_D$ that is supplied to the linear solenoid valve SLC1.

Moreover, since the solenoid valve S2 is turned on, and the signal pressure $P_{S2}$ is outputted, the first clutch apply relay valve 21, which receives the forward range pressure $P_D$ at the input port 21e from the oil passage a4, is set to the left-half position at the beginning of the shift to the D range (at the beginning of the N-D shift), due to the biasing force of the spring 21s and the signal pressure $P_{S2}$ that is applied to the oil chamber 21f, and outputs the forward range pressure $P_D$ as a first preliminary oil pressure $P_{DC1}$ from the output port 21d to the oil passage k.

On the other hand, since the solenoid valve S2 is turned on and the signal pressure $P_{S2}$ is inputted to the oil chamber 22k, and also, the solenoid valve S1 is turned off and no signal pressure $P_{S1}$ is inputted to the oil chamber 22a, the second clutch apply relay valve 22 is set to the left-half position due to the biasing force of the spring 22s and the signal pressure $P_{S2}$ that is applied to the oil chamber 22k, and the first preliminary oil pressure $P_{DC1}$, outputted through the oil passage k, is blocked by the input port 22g.

Then, when, for example, the control unit determines that the shift speed is the first forward speed, the linear solenoid valve SLC1 is turned on by electric control of the control unit. Thus, the linear solenoid valve SLC1 regulates and controls the forward range pressure PD that is inputted to the input port SLC1a, and outputs a control pressure $P_{SLC1}$ as an engagement pressure $P_{C1}$ from the output port SLC1b so that the control pressure $P_{SLC1}$ increases gradually. Thus, the control pressure $P_{SLC1}$ (the engagement pressure $P_{C1}$) is inputted to the input port 22e of the second clutch apply relay valve 22 through the oil passage b1. Thus, the second clutch apply relay valve 22, located at the left-half position, outputs the control pressure $P_{SLC1}$, received at the input port 22e, from the output port 22f, and the control pressure $P_{SLC1}$ is outputted as the engagement pressure $P_{C1}$ to the hydraulic servo 41 through the oil passage b2, whereby the clutch C-1 is engaged. Thus, combined with latching of the one-way clutch F-1, the first forward speed is attained.

Moreover, the check valve 51 and the orifice 61 are provided in the oil passage b2. When supplying the engagement pressure $P_{C1}$ (the control pressure $P_{SLC1}$) to the hydraulic servo 41, the check valve 51 is closed to gently supply an oil pressure only through the orifice 61. When discharging the engagement pressure $P_{C1}$ from the hydraulic servo 41, the check valve 51 is opened to discharge the oil pressure more rapidly than when supplying the oil pressure. Moreover, the engagement pressure $P_{C1}$ supplied to the oil passage b2 is inputted to the oil chamber 31a of the C-1 damper 31 through the oil passage b3, and the C-1 damper 31 operates to prevent pulsation of the engagement pressure $P_{C1}$ that is supplied to and discharged from the hydraulic servo 41, to absorb a surge pressure (a sharp fluctuating pressure), and the like.

[Operation During Engine Braking at First Forward Speed]

Moreover, if, for example, the control unit determines that the engine braking applied at the first forward speed, the solenoid valve S1 is turned off with the solenoid valve S2 kept in the ON state, and pressure regulation control of the linear solenoid valve SLC2 is performed, according to an electric command from the control unit. Thus, the signal pressure $P_{S2}$ of the solenoid valve S2 is inputted to the oil chamber 24a of the B-2 relay valve 24 through the oil passage i5, the spool 24p is switched downwards in the figure against the biasing force of the spring 24s, and the B-2 relay valve 24 is set to the right-half position.

Moreover, when the solenoid valve S1 is turned off, the modulator pressure $P_{MOD}$, inputted to the input port S1a through the oil passages g1, g2, is outputted as a signal pressure $P_{S1}$ from the output port S1b. The modulator pressure $P_{MOD}$ is thus inputted to the oil chamber 22a of the second clutch apply relay valve 22 and the input port 24c of the B-2 relay valve 24 through the oil passages h1, h2, and also, is inputted from the output port 24b of the B-2 relay valve 24, located at the right-half position, to the oil chamber 23a of the C-2 relay valve 23 through the oil passage h3.

Then, the spool 23p of the C-2 relay valve 23 is switched downwards in the figure to the right-half position against the biasing force of the spring 23s, according to the signal pressure $P_{S1}$ inputted to the oil chamber 23a. Note that, although the signal pressure $P_{S1}$ is inputted to the oil chamber 22a in the second clutch apply relay valve 22, the spool 22p is kept locked at the left-half position since the signal pressure $P_{S2}$ in the oil chamber 22k and the biasing force of the spring 22s overcome.

Then, when pressure regulation control of the linear solenoid valve SLC2 is performed, and the control pressure $P_{SLC2}$ is outputted from the output port SLC2b, the control pressure $P_{SLC2}$ is inputted to the input port 22h of the second clutch apply relay valve 22 locked at the left-half position, through the oil passage c1, and is outputted as an engagement pressure $P_{B2}$ from the output port 22i to the oil passage c2.

The engagement pressure $P_{B2}$, outputted to the oil passage c2, is inputted to the input port 23b of the C-2 relay valve 23 located at the right-half position, and is outputted from the output port 23d. Moreover, the engagement pressure $P_{B2}$ is inputted to the input port 24e of the B-2 relay valve 24 located at the right-half position, through the oil passage m, is output from the output port 24g, and is inputted to the hydraulic servo 45 through the oil passage n, whereby the brake B-2 is latched. Thus, combined with the engagement of the clutch C-1, engine braking at the first forward speed is attained.

Note that the check valve 52 and the orifice 62 are provided in the oil passage c2. When supplying the engagement pressure $P_{B2}$ to the hydraulic servo 45 of the brake B-2, the check valve 52 is closed to gently supply an oil pressure only through the orifice 61. When discharging the engagement pressure $P_{B2}$ as described below, the check valve 52 is opened to rapidly discharge the oil pressure in the oil passage c2. Moreover, the engagement pressure $P_{B2}$ supplied to the oil passage c2 is inputted to the oil chamber 32a of the C2-B2 damper 32 through the oil passage c4, and the C2-B2 damper 32 operates to prevent pulsation of the engagement pressure $P_{B2}$ that is supplied to and discharged from the hydraulic servo 45, to absorb a surge pressure (a sharp fluctuating pressure), and the like.

Moreover, when, for example, the control unit determines that the vehicle is in normal drive at the first forward speed, that is, when the control unit determines that the engine braking has been released, the solenoid valve S1 is turned on, and the linear solenoid valve SLC2 is turned off and closed, whereby the control pressure $P_{SLC2}$ as an engagement pressure $P_{B2}$ is set to zero, and drained. Moreover, since the C-2 relay valve 23 is switched to the left-half position by turning-on of the solenoid valve S1, the engagement pressure $P_{B2}$ of the hydraulic servo 45 of the brake B-2 is discharged from the drain port EX through the B-2 relay valve 24, the oil passage m, and the output port 23d. Quick draining, which is faster than draining through the linear solenoid valve SLC2, is performed, whereby the brake B-2 is rapidly released.

[Operation at Second Forward Speed]

Then, if, for example, the control unit determines that there is to be a shift from the first forward speed to the second forward speed, pressure regulation control of the linear solenoid valve SLB1 is performed, while maintaining the pressure-regulating state of the linear solenoid valve SLC1, in the state where the solenoid valve S1 is ON and the solenoid valve S2 is ON, according to an electric command from the control unit, as in the case of the first forward speed (except for during engine braking).

That is, when pressure regulation control of the linear solenoid valve SLB1 is performed, a control pressure $P_{SLB1}$ is outputted from the output port SLB1b as an engagement pressure $P_{B1}$, and is inputted to the hydraulic servo 44 through the oil passage f1, whereby the brake B-1 is latched. Thus, combined with the engagement of the clutch C-1, the second forward speed is achieved.

The check valve 54 and the orifice 64 are provided in the oil passage f1. When supplying the engagement pressure $P_{B1}$ to the hydraulic servo 44 of the brake B-1, the check valve 54 is closed to gently supply an oil pressure only through the orifice 64. When discharging the engagement pressure $P_{B1}$ from the hydraulic servo 44, the check valve 54 is opened to discharge the oil pressure more rapidly than when supplying the oil pressure. Moreover, the engagement pressure $P_{B1}$ supplied to the oil passage f1 is inputted to the oil chamber 34a of the B-1 damper 34 through the oil passage f2, and the B-1 damper 34 operates to prevent pulsation of the engagement pressure $P_{B1}$ that is supplied to and discharged from the hydraulic servo 44, to absorb a surge pressure (a sharp fluctuating pressure), and the like.

[Operation at Third Forward Speed]

Then, if, for example, the control unit determines that there is to be a shift from the second forward speed to the third forward speed, the linear solenoid valve SLB1 is turned off and closed, and pressure regulation control of the linear solenoid valve SLC3 is performed, while maintaining the pressure regulating state of the linear solenoid valve SLC1, in the state where the solenoid valve S1 is ON and the solenoid valve S2 is ON as described above, according to an electric command from the control unit.

That is, first, the brake B-1 is controlled to be released by pressure regulation control of the linear solenoid valve SLB1. That is, the engagement pressure $P_{B1}$ (the control pressure $P_{SLB1}$) of the hydraulic servo 44 of the brake B-1 is controlled to be discharged from the drain port EX of the linear solenoid valve SLB1 through the oil passage f1, whereby the brake B-1 is released. Moreover, one linear solenoid valve SLC3 is turned on (energized) to regulate a control pressure $P_{SLC3}$, and the control pressure $P_{SLC3}$ is outputted from the output port SLC3b as an engagement pressure $P_{C3}$, and is inputted to the input port 22b of the second clutch apply relay valve 22 through the oil passage e1. The spool 22p of the second clutch apply relay valve 22 is locked at the left-half position by the signal pressure $P_{S2}$ of the oil chamber 22k and the biasing force of the spring 22s as described above, and the engagement pressure $P_{C3}$, inputted to the input port 22b, is outputted from the output port 22c to the hydraulic servo 43 through the oil passage e2, whereby the clutch C-3 is engaged. Thus, combined with the engagement of the clutch C-1, the third forward speed is attained.

The check valve 53 and the orifice 63 are provided in the oil passage e2. When supplying the engagement pressure $P_{C3}$ to the hydraulic servo 43 of the clutch C-3, the check valve 53 is closed to gently supply an oil pressure only through the orifice 63. When discharging the engagement pressure $P_{C3}$ from the hydraulic servo 43, the check valve 53 is opened to discharge the oil pressure more rapidly than when supplying the oil pressure. Moreover, the engagement pressure $P_{C3}$ supplied to the oil passage e2 is inputted to the oil chamber 33a of the C-3 damper 33 through the oil passage e3, and the C-1 damper 33 operates to prevent pulsation of the engagement pressure $P_{C3}$ that is supplied to and discharged from the hydraulic servo 44, to absorb a surge pressure (a sharp fluctuating pressure), and the like.

[Operation at Fourth Forward Speed]

Then, if, for example, the control unit determines that there is to be a shift from the third forward speed to the fourth forward speed, the solenoid valve S2 is turned off with the solenoid valve S1 kept in the ON state, whereas the linear solenoid valve SLC3 is turned off and closed, and pressure regulation control of the linear solenoid valve SLC2 is performed, while maintaining the pressure regulating state of the linear solenoid valve SLC1, according to an electric command from the control unit.

That is, first, since the solenoid valve S2 is turned off, the signal pressure $P_{S2}$, which has been outputted to the oil passages i1 through i5, is no longer outputted. Thus, the signal pressure $P_{S2}$ is no longer inputted to the oil chamber 24a of the B-2 relay valve 24, and the spool 24p of the B-2 relay valve 24 is switched to the left-half position by the biasing force of the spring 24s. Moreover, although the signal pressure $P_{S2}$ is no longer input to the oil chamber 22k, the second clutch apply relay valve 22 is maintained at the left-half position by the biasing force of the spring 22s.

On the other hand, the clutch C-3 is controlled to be released by pressure regulation control of the linear solenoid valve SLB3. That is, an engagement pressure $P_{C3}$ (a control pressure $P_{SLB3}$) of the hydraulic servo 43 of the clutch C-3 is controlled to be discharged from the drain port EX of the linear solenoid valve SLC3 through the oil passages e1, e2, whereby the clutch C-3 is released. Moreover, the linear solenoid valve SLC2 is turned on (energized) to regulate a control pressure $P_{SLC2}$, and the control pressure $P_{SLC2}$ is outputted from the output port SLC2b as an engagement pressure $P_{C2}$, and is inputted to the input port 22h of the second clutch apply relay valve 22 through the oil passage c1.

Since the second clutch apply relay valve 22 is maintained at the left-half position as described above, the control pressure $P_{SLC2}$ (the engagement pressure $P_{C2}$), inputted to the input port 22h, is outputted from the output port 22i as the engagement pressure $P_{C2}$. The engagement pressure $P_{C2}$, outputted from the output port 22i, is inputted to the input port 23b of the C-2 relay valve 23 through the oil passage c2.

Moreover, the solenoid valve S2 is turned off, and the B-2 relay valve 24 is set to the left-half position, and the oil chamber 23a and the oil passage h3 are rendered in a draining state, whereby the C-2 relay valve 23 is set to the left-half position by the biasing force of the spring 23s. Thus, the engagement pressure $P_{C2}$, inputted to the input port 23b, is outputted from the output port 23c, and is outputted also from the output port 23e. The engagement pressure $P_{C2}$, outputted from the output port 23c, is inputted to the oil chamber 21a of the first clutch apply relay valve 21 through the oil passage c5. Since the signal pressure $P_{S2}$ is no longer inputted to the oil chamber 21*f*, and the engagement pressure $P_{C2}$ is inputted to the oil chamber 21*a*, the engagement pressure $P_{C2}$ overcomes the biasing force of the spring 21*s*, whereby the first clutch apply relay valve 21 is switched to the right-half position.

At this time, the forward range pressure $P_D$, inputted to the input port 21*e* through the oil passage a1, is outputted to the oil passage j1 as a second preliminary oil pressure $P_{DC2}$ by switching the output port from the output port 21*d* to the output port 21*g*, but is blocked by the input port 22*j* of the second clutch apply relay valve 22. Moreover, the second preliminary oil pressure $P_{DC2}$ (the forward range pressure $P_D$), supplied to the oil passage j1, is inputted as a lock pressure to the oil chambers 21*b*, 21*c* through the oil passages j2, j3, and the spool 21*s* of the first clutch apply relay valve 21 is locked at the right-half position.

Then, the engagement pressure $P_{C2}$, outputted from the output port 23*e* of the C-2 relay valve 23, is inputted to the hydraulic servo 42 through the oil passage c3, and the clutch C-2 is engaged. Thus, combined with the engagement of the clutch C-1, the fourth forward speed is attained.

Moreover, the check valve 52 and the orifice 62 are provided in the oil passage c2. As in the case of the engine braking at the first forward speed, when supplying the engagement pressure $P_{C2}$ to the hydraulic servo 42 of the clutch C-2, the check valve 52 is closed to gently supply an oil pressure only through the orifice 62. When discharging the engagement pressure $P_{C2}$ from the hydraulic servo 42, the check valve 52 is opened to discharge the oil pressure more rapidly than when supplying the oil pressure. Moreover, the engagement pressure $P_{C2}$ supplied to the oil passage c2 is inputted to the oil chamber 32*a* of the C2-B2 damper 32 through the oil passage c4, and the C2-B2 damper 32 operates to prevent pulsation of the engagement pressure $P_{C2}$ that is supplied to and discharged from the hydraulic servo 42, to absorb a surge pressure (a sharp fluctuating pressure), and the like.

[Operation at Fifth Forward Speed]

Then, if, for example, the control unit determines that there is to be a shift from the fourth forward speed to the fifth forward speed, the linear solenoid valve SLC1 is turned off and closed, and pressure regulation control of the linear solenoid valve SLC3 is performed, while maintaining the pressure regulating state of the linear solenoid valve SLC2, in the state where the solenoid valve S1 is ON and the solenoid valve S2 is OFF as described above, according to an electric command from the control unit.

That is, first, the clutch C-1 is controlled to be released by pressure regulation control of the linear solenoid valve SLC1. That is, an engagement pressure $P_{C1}$ (a control pressure $P_{SLC1}$) of the hydraulic servo 41 of the clutch C-1 is controlled to be discharged from the drain port EX of the linear solenoid valve SLC1 through the oil passages b1, b2, whereby the clutch C-1 is released. Moreover, as in the case of the third forward speed, one linear solenoid valve SLC3 is turned on (energized) to regulate a control pressure $P_{SLC3}$, and the control pressure $P_{SLC3}$ is outputted from the output port SLC3*b* as an engagement pressure $P_{C3}$, and is inputted to the hydraulic servo 43 through the oil passage e1, the second clutch apply relay valve 22, and the oil passage e2, whereby the clutch C-3 is engaged. Thus, combined with the engagement of the clutch C-2, the fifth forward speed is attained.

[Operation at Sixth Forward Speed]

Then, if, for example, the control unit determines that there is to be a shift from the fifth forward speed to the sixth forward speed, the linear solenoid valve SLC3 is turned off, and pressure regulation control of the linear solenoid valve SLB1 is performed, while maintaining the pressure regulating state of the linear solenoid valve SLC2, in the state where the solenoid valve S1 is ON and the solenoid valve S2 is OFF as described above, according to an electric command from the control unit.

That is, first, the clutch C-3 is controlled to be released by pressure regulation control of the linear solenoid valve SLC3. That is, an engagement pressure $P_{C3}$ (a control pressure $P_{SLC3}$) of the hydraulic servo 43 of the clutch C-3 is controlled to be discharged from the drain port EX of the linear solenoid valve SLC3 through the oil passage e1, the second clutch apply relay valve 22, and the oil passage e2, whereby the clutch C-3 is released. Moreover, as in the case of the second forward speed, one linear solenoid valve SLB1, which has been closed so that the control pressure $P_{SLB1}$ becomes a zero pressure, is turned on (energized) for pressure regulation control, and a control pressure $P_{SLB1}$ is outputted from the output port SLB1*b* as an engagement pressure $P_{B1}$, and is inputted to the hydraulic servo 44 through the oil passage f1, whereby the brake B-1 is engaged. Thus, combined with the engagement of the clutch C-2, the sixth forward speed is attained.

[Operation During 4-3 Shifting]

Moreover, if it is determined that there is a down shift from the fourth forward speed to the third forward speed described above, the linear solenoid valve SLC2 is turned off, and also, the solenoid valve S2 is turned on, and the linear solenoid valve SLC3 is turned on. Thus, the engagement pressure $P_{C2}$ of the clutch C-2, which has been inputted to the first clutch apply relay valve 21 through the oil passage c5, is no longer inputted to the first clutch apply relay valve 21, and the signal pressure $P_{S2}$ is inputted to the oil chamber 21*f*. Although the second preliminary oil pressure $P_{DC2}$ is inputted to the oil chambers 21*b*, 21*c* as a lock pressure, the signal pressure $P_{S2}$ of the oil chamber 21*f* and the biasing force of the spring 21*s* overcome the lock pressure (the second preliminary oil pressure $P_{DC2}$) of the oil chambers 21*b*, 21*c*, whereby the first clutch apply relay valve 21 is switched to the left-half position. Thus, the forward range pressure $P_D$, inputted to the input port 21*e*, is outputted to the oil passage k as a first preliminary oil pressure $P_{DC1}$ by switching the output port from the output port 21*g* to the output port 21*d*, and the lock pressure to the oil chambers 21*b*, 21*c* is blocked.

Note that, since other functions are similar to those of the operation at the third forward speed described above, description thereof will be omitted. Moreover, the operation of the first clutch apply relay valve 21 in the 4-3 shifting is not limited to that in this 4-3 shifting, but is similar also in the case where the shift speed is shifted from the sixth to fourth forward speed, to the third to first forward speed (e.g., 6-3 shifting, 4-2 shifting, and the like). Moreover, the operation of the first clutch apply relay valve 21 to the right-half position, which was described above in the operation at the fourth forward speed, is not limited to that in 3-4 shifting, but is similar also in the case where the shift speed is shifted from the first to third forward speed, to the fourth to sixth forward speed (e.g., 3-6 shifting, 2-4 shifting, and the like).

[Operation in D-N]

Moreover, if, for example, the driver slows down the vehicle, and the shift speed is down-shifted according to the vehicle speed until the vehicle is stopped at the first forward speed, and then, the driver shifts the shift lever from the D range position to the N range position, the forward range pressure output port of the manual shift valve is disconnected from the input port thereof, and communicates with the drain port. That is, the forward range pressure $P_D$ is drained.

At the same time, if a shift lever sensor (not shown) detects that the shift lever is at the N range position, and the control unit determines the shift range is the N range based on the shift lever position, the linear solenoid valves SLC2, SLC3, SLB1 are first turned off, and the respective control pressures $P_{SLC2}$, $P_{SLC3}$, $P_{SLB1}$ thereof are drained to a zero pressure (a non-outputting state). That is, the respective oil pressures of the hydraulic servos 42, 43, 44, 45 are drained, whereby the clutch C-2, the clutch C-3, the brake B-1, and the brake B-2 are released. Moreover, the solenoid valve S2 is turned off, and the solenoid valve S1 is kept in the ON (energized) state. That is, the signal pressures $P_{S1}$, $P_{S2}$ are no longer outputted from the solenoid valves S1, S2.

On the other hand, the linear solenoid valve SLC1 is subject to a release shock if, for example, the clutch C-1 is rapidly released. Thus, the clutch C-1 is gently released by draining the control pressure $P_{SLC1}$ eventually to a zero pressure (a non-outputting state) while performing pressure regulation control so as to gradually reduce the control pressure $P_{SLC1}$. Then, when this clutch C-1 is also released, all of the clutches and brakes in the automatic transmission 3 are released, whereby a neutral state is attained.

During this release control by the linear solenoid valve SLC1, the accumulator 30, connected to the input port SLC1a of the linear solenoid valve SLC1 through the oil passage a3 and the like, maintains the pressure by discharging the oil pressure accumulated while the shift range is the D range, to the oil passage a5 located on the linear solenoid valve SLC1 side of the orifice 60. This enables the clutch C-1 to be gradually released by the linear solenoid valve SLC1, and thus, prevents a release shock from occurring during D-N shifting from the state at the first forward speed.

[Operation at First Reverse Speed]

If, for example, the driver shifts the shift lever to the R range position, a reverse range pressure $P_{REV}$ is outputted from the reverse range pressure output port of the manual shift valve as described above, and the reverse range pressure $P_{REV}$ is inputted to the input port 24d of the B-2 relay valve 24 through the oil passage 1 and the like.

At the same time, if the shift lever sensor (not shown) detects that the shift lever is at the R range position, and the control unit determines the shift lever position is the R range, the solenoid valve S1 is kept in the ON (energized) state, and the solenoid valve S2 is also kept in the OFF state. That is, since no signal pressure $P_{S2}$ is output, the B-2 relay valve 24 is maintained at the left-half position by the biasing force of the spring 24s. Thus, the reverse range pressure $P_{REV}$, inputted to the input port 24d, is supplied to the hydraulic servo 45 of the brake B-2 through the output port 24g and the oil passage n, whereby the brake B-2 is engaged.

Moreover, the control unit performs pressure regulation control of the linear solenoid valve SLC3 so as to gradually output the control pressure $P_{SLC3}$, whereby the control pressure $P_{SLC3}$ is outputted from the output port SLC3c as an engagement pressure $P_{C3}$, and is inputted to the hydraulic servo 43 through the oil passage e1 and the second clutch apply relay valve 22, and the oil passage e2. That is, the clutch C-3 is gradually engaged. Thus, combined with the latching of the brake B-2, the first reverse speed is attained.

Note that when the shift range is switched from the R range to the N range, a state similar to that of the N range is attained. That is, an engagement pressure $P_{B2}$ of the hydraulic servo 45 of the brake B-2 is drained through the oil passage n, the B-2 relay valve 24, the oil passage 1, and the manual shift valve, and an engagement pressure PC3 of the hydraulic servo 43 of the clutch C-3 is drained from the linear solenoid valve SLC3.

Moreover, if, for example, it is detected that the vehicle speed has a predetermined value or more in the forward direction when the driver shifts the shift lever to the R range position, the control unit turns on the solenoid valve S2, and maintains the linear solenoid valve SLC3 in the ON (energized) state. That is, the control unit performs a so-called reverse inhibit function to block an R range pressure $P_{REV}$ by the B-2 relay valve 24 so that no R range pressure $P_{REV}$ is supplied to the hydraulic servo 45 of the brake B-2, and to supply no engagement pressure $P_{C3}$ (no control pressure $P_{SLC3}$) to the hydraulic servo 43 of the clutch C-3, thereby preventing the first reverse speed from being attained.

[Operation During All-Solenoids-Off Fail]

Next, operation during all-solenoids-off failure in the hydraulic control apparatus 1 will be described below. If all the solenoid valves (the linear solenoid valve SLC1, the linear solenoid valve SLC2, the linear solenoid valve SLC3, the linear solenoid valve SLB1, the solenoid valve S1, and the solenoid valve S2) are subject to OFF failure (hereinafter referred to as the "all-off failure") due to, e.g., failures of the control unit, short-circuits, wire disconnections, or the like, during normal traveling in the state where the shift lever position is the D range, all the linear solenoid valves SLC1, SLC2, SLC3, SLB1 and the solenoid valve S2 are of a normally closed type, and thus, output no oil pressure, while the solenoid valve S1 is of a normally open type, and thus, outputs an oil pressure.

During traveling at the first forward speed to the third forward speed in a normal state, the spool 21p of the first clutch apply relay valve 21 is set to the left-half position (the lower shift speed-side position), and thus, a first preliminary oil pressure $P_{DC1}$, outputted from the output port 21d, is inputted to the input port 22g of the second clutch apply relay valve 22 through the oil passage k, and is blocked by the second clutch apply relay valve 22 located at the left-half position (the normal-state position). Moreover, the line pressure $P_L$ is inputted to the input port 22d, and similarly, is blocked by the second clutch apply relay valve 22 located at the left-half position (the normal-state position).

If the all-off failure occurs in this state, the solenoid valve S2 is turned off, and the signal pressure $P_{S2}$ is no longer inputted to the oil chamber 22k, and the signal pressure $P_{S1}$, outputted from the solenoid valve S1, is inputted to the oil chamber 22a through the oil passage h1, whereby the second clutch apply relay valve 22 is switched to the right-half position (the failure-state position), and the first preliminary oil pressure $P_{DC1}$, inputted to the input port 22g, is outputted from the output port 22f, and is inputted to the hydraulic servo 41 through the oil passage b2, whereby the clutch C-1 is engaged. Moreover, the line pressure $P_L$, inputted to the input port 22d, is outputted from the output port 22c, and is inputted to the hydraulic servo 43 through the oil passage e2, whereby the clutch C-3 is engaged. Thus, the clutch C-1 and the clutch C-3 are engaged, whereby the third forward speed is attained (see FIG. 2). That is, if the all-off failure occurs during traveling at the first forward speed to the third forward speed, the traveling state of the third forward speed is ensured.

Moreover, during traveling at the fourth forward speed to the sixth forward speed in the normal state, the spool 21p of the first clutch apply relay valve 21 is set to the right-half position (the higher shift speed-side position), and thus, a second preliminary oil pressure $P_{DC2}$, outputted from the output port 21g, is inputted to the input port 22j of the second clutch apply relay valve 22 through the oil passages j1, j4, and is blocked by the second clutch apply relay valve 22 located at the left-half position (the normal-state position). Similarly, a line pressure $P_L$ is inputted to the input port 22d, and is similarly blocked by the second clutch apply relay valve 22 located at the left-half position (the normal-state position).

If the all-off failure occurs in this state, the second clutch apply relay valve 22 is switched to the right-half position by the signal pressure $P_{S1}$ of the solenoid valve S1 in a manner similar to that described above, and a second preliminary oil pressure $P_{DC2}$, inputted to the input port 22j, is outputted from the output port 22i, and is inputted to the hydraulic servo 42 through the oil passage c2, the C-2 relay valve 23, and the oil passage c3, whereby the clutch C-2 is engaged. Moreover, the line pressure $P_L$, inputted to the input port 22d, is outputted from the output port 22c, and is inputted to the hydraulic servo 43 through the oil passage e2, whereby the clutch C-3 is engaged. Thus, the clutch C-2 and the clutch C-3 are engaged, whereby the fifth forward speed is attained (see FIG. 2). That is, if the all-off failure occurs during traveling at the fourth forward speed to the sixth forward speed, the traveling state of the fifth forward speed is ensured.

Moreover, in the case where the all-off failure occurs during normal traveling at the fourth forward speed to the sixth forward speed, if the vehicle is stopped, and the shift lever is temporarily shifted to the N range position, the manual shift valve, not shown, stops outputting the forward range pressure $P_D$, and drains the forward range pressure $P_D$. Especially if the first clutch apply relay valve 21 is located at the right-half position (the higher shift speed-side position), the second preliminary oil pressure $P_{DC2}$, supplied as a lock pressure to the oil chambers 21b, 21c through the oil passages j1, j2, j3, is drained, and the lock is released. Thus, the spool 21p of the first clutch apply relay valve 21 is switched to the left-half position (the lower shift speed-side position) by the biasing force of the spring 21s.

Note that, in the state of the N-range in the all-off failure, the signal pressure $P_{S1}$ of the solenoid valve S1 is kept being output, and the second clutch apply relay valve 22 is maintained at the right-half position. Thus, the line pressure $P_L$ from the oil passage d2 passes through the second clutch apply relay valve 22, and is supplied to the hydraulic servo 43, whereby the clutch C-3 is engaged. Moreover, even if the clutch C-3 is in the engaged state, the clutches C-1, C-2 and the brake B-1, B-2 are released. Thus, even if the reduced rotation is inputted to the sun gear S2, the sun gear S3 and the carrier CR2 idle, and thus, the input shaft 10 and the counter gear 11 are in a substantially neutral state (see FIG. 1).

Then, if, for example, the driver shifts the shift lever back to the D range position, the forward range pressure $P_D$ is outputted from the manual shift valve, and the forward range pressure $P_D$ is inputted to the input port 21e of the first clutch apply relay valve 21 switched to the left-half position (the lower shift speed-side position), and is outputted from the output port 21d to the oil passage k as the first preliminary oil pressure $P_{DC1}$, and is inputted to the hydraulic servo 41 of the clutch C-1 through the input port 22g and the output port 22f of the second clutch apply relay valve 22 located at the right-half position, and the oil passage b2, whereby the clutch C-1 is engaged. That is, a state, which is similar to that when the all-off failure occurs during traveling at the first forward speed to the third forward speed, is attained, whereby the third forward speed is ensured. Thus, the vehicle can be restarted even after the vehicle is temporarily stopped after the all-off failure, whereby a limp-home function is ensured.

As described above, according to the hydraulic control apparatus 1 of the automatic transmission, the first clutch apply relay valve 21 is switched between the lower shift speed-side position where the first clutch apply relay valve 21 outputs the first preliminary oil pressure $P_{DC1}$ for the hydraulic servo 41 of the clutch C-1, and the higher shift speed-side position where the first clutch apply relay valve 21 outputs the second preliminary oil pressure $P_{DC2}$ for the hydraulic servo 42 of the clutch C-2, based on the engagement state of the clutch C-2 (that is, the engagement pressure $P_{C2}$ that is inputted to the oil chamber 21a). Moreover, the second clutch apply relay valve 22 is switched between the normal-state position where the second clutch apply relay valve 22 can supply the control oil pressures $P_{SLC1}$, $P_{SLC2}$, $P_{SLC3}$ of the linear solenoid valves SLC1, SLC2, SLC3 to the hydraulic servos 41, 42, 43 of the clutches C-1, C-2, C-3, respectively, and the failure-state position where the second clutch apply relay valve 22 can supply the first and second preliminary oil pressures $P_{DC1}$, $P_{DC2}$ to the hydraulic servos 41, 42 of the clutches C-1, C-2, and can supply the line pressure $P_L$ to the hydraulic servo 43 of the clutch C-3, during the all-off failure. Thus, all the linear solenoid valves (especially the linear solenoid valves SLC1, SLC2, SLC3) can be formed by normally closed type linear solenoid valves to reduce power consumption. Thus, one of the third forward speed and the fifth forward speed can be attained in case of the all-off failure, without complicating the oil passage structure, while enabling fuel economy of a vehicle to be improved. Thus, the failure-safe function can be enhanced.

Moreover, since the solenoid valve S1, which is formed by a normally open type that is energized during normal traveling and outputs the signal pressure $P_{S1}$ when being de-energized, is included, the second clutch apply relay valve 22 can be switched between the normal-state position by the biasing force of the spring 22s, and failure-state position by the signal pressure $P_{S1}$ of the solenoid valve S1 that is inputted to the oil chamber 22a.

On the other hand, at lower shift speeds at which the clutch C-2 is not engaged, the spool 21p of the first clutch apply relay valve 21 is switched to the lower shift speed-side position by the biasing force of the spring 21s. At higher shift speeds at which the clutch C-2 is engaged, the spool 21p of the first clutch apply relay valve 21 is switched to the high shift speed-side position by the engagement pressure $P_{C2}$ of the oil chamber 21a against the biasing force of the spring 21s, and is locked by the second preliminary oil pressure $P_{DC2}$ of the oil chambers 21b, 21c. Moreover, in the case of shifting from a higher shift speed to a lower shift speed, the spool 21p is switched to the lower shift speed-side position based on the signal pressure $P_{S2}$ of the solenoid valve S2 of the oil chamber 21f. Thus, the first clutch apply relay valve 21 can be structured so as to supply the first preliminary oil pressure $P_{DC1}$ to the hydraulic servo 41 of the clutch C-1 when the all-off failure occurs at any lower shift speed, and so as to supply the second preliminary oil pressure $P_{DC2}$ to the hydraulic servo 42 of the clutch C-2 when the all-off failure occurs at any higher shift speed.

Moreover, when the vehicle is restarted in the all-off failure state, the first clutch apply relay valve 21 is switched to the lower shift speed-side position based on the biasing force of the spring 21s, and the second clutch apply relay valve 22 is switched to the failure-state position, whereby the first preliminary oil pressure $P_{DC1}$ is supplied to the hydraulic servo 41 of the clutch C-1. Thus, the third forward speed is attained, enabling restarting of the vehicle.

More specifically, the first clutch apply relay valve 21 receives the forward range pressure $P_D$ as a source pressure of the first and second preliminary oil pressures $P_{DC1}$, $P_{CD2}$. Thus, in the case of restarting the vehicle in the all-off failure state, the manual shift valve is switched to, e.g., the N range to discharge the forward range pressure $P_D$, and then, is switched back to the D range to supply the first preliminary oil pressure $P_{DC1}$ to the hydraulic servo 41 of the clutch C-1, whereby the third forward speed is attained, enabling restarting of the vehicle. This can eliminate the need for a separate operation, such as temporarily stopping the engine, when, e.g., restarting the vehicle in the all-off failure state.

Note that, the present embodiment was described above with respect to an example in which the hydraulic control apparatus 1 for the automatic transmission is applied to the automatic transmission 3 that attains six forward speeds, and one reverse speed. However, it is to be understood that the present invention is not limited to this, and may be applied to, for example, automatic transmissions that attain eight forward speeds, and the present invention is applicable especially to any staged automatic transmissions.

The hydraulic control apparatus for the automatic transmission according to the present invention can be used as control apparatuses for automatic transmissions that are mounted on passenger cars, trucks, and the like. Especially, the hydraulic control apparatus for the automatic transmission of the present invention is preferably used as control apparatuses for automatic transmissions in which solenoid valves, for supplying a working fluid pressure to hydraulic servos of friction engagement elements, are formed by normally closed type solenoid valves, and which are required to attain one of a low shift speed and a high shift speed even in an all-solenoids-off state.

What is claimed is:

1. A hydraulic control apparatus for an automatic transmission, comprising:
    a first solenoid valve capable of supplying a first working fluid pressure to a hydraulic servo of a first friction engagement element;
    a second solenoid valve capable of supplying a second working fluid pressure to a hydraulic servo of a second friction engagement element; and
    a third solenoid valve capable of supplying a third working fluid pressure to a hydraulic servo of a third friction engagement element, wherein
    the second friction engagement element is engaged at higher shift speeds, and
    the hydraulic control apparatus attains a low shift speed, which is one of lower shift speeds, by engaging the first friction engagement element and the third friction engagement element, and attains a high shift speed, which is one of the higher shift speeds, by engaging the second friction engagement element and the third friction engagement element, wherein
    the first, second, and third solenoid valves are formed by normally closed type solenoid valves that do not output the first, second, and third working fluid pressures when being de-energized, and
    the hydraulic control apparatus further comprises:
    a preliminary shift speed switch valve, which is switched between a lower shift speed-side position where a first preliminary oil pressure for the hydraulic servo of the first friction engagement element is output, and a higher shift speed-side position where a second preliminary oil pressure for the hydraulic servo of the second friction engagement element is output, based on an engagement state of the second friction engagement element; and
    an oil pressure supply switch valve, which is switched between a normal-state position where the first, second, and third working fluid pressures can be supplied to the hydraulic servos of the first, second, and third friction engagement elements, respectively, and a failure-state position where the first and second preliminary oil pressures can be supplied to the hydraulic servos of the first and second friction engagement elements, respectively, and a line pressure can be supplied to the hydraulic servo of the third friction engagement element, during a failure that causes de-energization.

2. The hydraulic control apparatus for the automatic transmission according to claim 1, wherein
    the hydraulic control apparatus further comprises a fourth solenoid valve that is formed by a normally open type solenoid valve that is energized during normal traveling, and that outputs a signal oil pressure when being de-energized, and
    the oil pressure supply switch valve has a first spool, first biasing means for biasing the first spool to the normal-state position, and a first oil chamber for receiving the signal oil pressure of the fourth solenoid valve, and switching the first spool to the failure-state position against a biasing force of the first biasing means.

3. The hydraulic control apparatus for the automatic transmission according to claim 2, wherein
    the hydraulic control apparatus further comprises a fifth solenoid valve for outputting a signal oil pressure at the lower shift speeds,
    the preliminary shift speed switch valve has a second spool, second biasing means for biasing the second spool to the lower shift speed-side position, a second oil chamber for receiving an oil pressure of the hydraulic servo of the second friction engagement element, and switching the second spool to the higher shift speed-side position against a biasing force of the second biasing means, a third oil chamber for receiving the second preliminary oil pressure, outputted at the higher shift speed-side position, as a lock pressure, and locking the second spool to the higher shift speed-side position, and a fourth oil chamber for receiving the signal oil pressure of the fifth solenoid valve, and switching the second spool to the lower shift speed-side position,
    at the lower shift speeds, the preliminary shift speed switch valve is switched to the lower shift speed-side position, based on the biasing force of the second biasing means, and the signal oil pressure of the fifth solenoid valve of the fourth oil chamber, and outputs the first preliminary oil pressure, and
    at the higher shift speeds, the preliminary shift speed switch valve is switched to the higher shift speed-side position, based on an oil pressure of the hydraulic servo of the second friction engagement element of the second oil chamber, and the lock pressure of the third oil chamber, and outputs the second preliminary oil pressure.

4. The hydraulic control apparatus for the automatic transmission according to claim 3, wherein
    when a vehicle is restarted upon a failure that causes de-energization, the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

5. The hydraulic control apparatus for the automatic transmission according to claim 4, wherein
    the hydraulic control apparatus further comprises a range switch valve for outputting the line pressure as a forward range pressure in a forward range, and discharging the forward range pressure in other range,
    the preliminary shift speed switch valve receives the forward range pressure as a source pressure of the first and second preliminary oil pressures, and
    when the vehicle is restarted upon a failure that causes de-energization, the range switch valve is switched to the other range to discharge the forward range pressure, and then, is switched back to the forward range, whereby the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

6. The hydraulic control apparatus for the automatic transmission according to claim 1, wherein the hydraulic control apparatus further comprises a fifth solenoid valve for outputting a signal oil pressure at the lower shift speeds, the preliminary shift speed switch valve has a second spool, second biasing means for biasing the second spool to the lower shift speed-side position, a second oil chamber for receiving an oil pressure of the hydraulic servo of the second friction engagement element, and switching the second spool to the higher shift speed-side position against a biasing force of the second biasing means, a third oil chamber for receiving the second preliminary oil pressure, outputted at the higher shift speed-side position, as a lock pressure, and locking the second spool to the higher shift speed-side position, and a fourth oil chamber for receiving the signal oil pressure of the fifth solenoid valve, and switching the second spool to the lower shift speed-side position, at the lower shift speeds, the preliminary shift speed switch valve is switched to the lower shift speed-side position, based on the biasing force of the second biasing means, and the signal oil pressure of the fifth solenoid valve of the fourth oil chamber, and outputs the first preliminary oil pressure, and at the higher shift speeds, the preliminary shift speed switch valve is switched to the higher shift speed-side position, based on an oil pressure of the hydraulic servo of the second friction engagement element of the second oil chamber, and the lock pressure of the third oil chamber, and outputs the second preliminary oil pressure.

7. The hydraulic control apparatus for the automatic transmission according to claim 6, wherein when a vehicle is restarted upon a failure that causes de-energization, the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

8. The hydraulic control apparatus for the automatic transmission according to claim 7, wherein the hydraulic control apparatus further comprises a range switch valve for outputting the line pressure as a forward range pressure in a forward range, and discharging the forward range pressure in other range, the preliminary shift speed switch valve receives the forward range pressure as a source pressure of the first and second preliminary oil pressures, and when the vehicle is restarted upon a failure that causes de-energization, the range switch valve is switched to the other range to discharge the forward range pressure, and then, is switched back to the forward range, whereby the preliminary shift speed switch valve is switched to the lower shift speed-side position, based on the biasing force of the second biasing means, and the oil pressure supply switch valve is switched to the failure-state position, whereby the first preliminary oil pressure is supplied to the hydraulic servo of the first friction engagement element.

\* \* \* \* \*